(12) United States Patent  
Cho

(10) Patent No.: US 9,122,305 B2  
(45) Date of Patent: Sep. 1, 2015

(54) DISPLAY DEVICE HAVING TOUCH SENSORS AND METHOD FOR TRANSMITTING TOUCH COORDINATE DATA THEREOF

(71) Applicant: LG DISPLAY CO., LTD., Seoul (KR)

(72) Inventor: Jiho Cho, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 121 days.

(21) Appl. No.: 13/691,283

(22) Filed: Nov. 30, 2012

(65) Prior Publication Data

US 2013/0162557 A1 Jun. 27, 2013

(30) Foreign Application Priority Data

Dec. 22, 2011 (KR) ........................ 10-2011-0140512

(51) Int. Cl.
*G06F 3/01* (2006.01)
*G06F 3/041* (2006.01)
*G06F 3/044* (2006.01)

(52) U.S. Cl.
CPC ................ *G06F 3/01* (2013.01); *G06F 3/0412* (2013.01); *G06F 3/0416* (2013.01); *G06F 3/044* (2013.01)

(58) Field of Classification Search
CPC ......... G06F 3/041; G06F 3/01; G06F 3/0488; G06F 3/0418; G06F 3/03; G06F 3/044; G06F 2203/04112; G06F 2203/04104
USPC ...................... 345/173–175; 178/18.01–18.06
See application file for complete search history.

(56) References Cited

U.S. PATENT DOCUMENTS

| | | | |
|---|---|---|---|
| 2002/0190959 A1* | 12/2002 | Nagao ........................... | 345/173 |
| 2010/0283752 A1* | 11/2010 | Maeda .......................... | 345/173 |
| 2011/0043473 A1* | 2/2011 | Kozuma ........................ | 345/173 |
| 2011/0087455 A1* | 4/2011 | Chang et al. .................. | 702/150 |
| 2012/0044150 A1* | 2/2012 | Karpin et al. ................. | 345/173 |
| 2012/0274583 A1* | 11/2012 | Haggerty ..................... | 345/173 |

FOREIGN PATENT DOCUMENTS

| | | | |
|---|---|---|---|
| CN | 101609396 A | * | 12/2009 |
| CN | 102455817 A | | 5/2012 |
| KR | 10-2011-0020742 A | | 3/2011 |
| KR | 10-1057620 B1 | | 8/2011 |
| KR | 10-2011-0100872 A | | 9/2011 |

* cited by examiner

*Primary Examiner* — Alexander Eisen  
*Assistant Examiner* — Abhishek Sarma  
(74) *Attorney, Agent, or Firm* — Birch, Stewart, Kolasch & Birch, LLP

(57) ABSTRACT

A display device having touch sensors includes a display panel having a touch screen, a Tx driving circuit supplying a touch driving pulse to Tx electrode lines of the touch screen, an Rx driving circuit which samples voltages of the touch sensors received through Rx electrode lines of the touch screen due to the supply of the touch driving pulse and outputs touch raw data from the voltages of the touch sensors, and a touch controller which obtains a plurality of touch groups based on the touch raw data, sets a transmission format of an effective touch group, on which a touch operation is performed, among the plurality of touch groups to a variable touch coordinate packet, and transmits the variable touch coordinate packet to an external host system.

4 Claims, 10 Drawing Sheets

| BYTE1 | X1 High (X1 Bits 11 ~ 8) | Y1 High(Y1 Bits 11 ~ 8) |
|---|---|---|
| BYTE2 | X1 Low (X1 Bits 7   0) ||
| BYTE3 | Y1 Low (Y1 Bits 7   0) ||
| BYTE4 | X2 High (X2 Bits 11 ~ 8) | Y2 High(Y2 Bits 11 ~ 8) |
| BYTE5 | X2 Low (X2 Bits 7 ~ 0) ||
| BYTE6 | Y2 Low (Y2 Bits 7 ~ 0) ||

| BYTE31 | X11 High (X11 Bits 11 ~ 8) | Y11 High(Y11 Bits 11 ~ 8) |
|---|---|---|
| BYTE32 | X11 Low (X11 Bits 7 ~ 0) ||
| BYTE33 | Y11 Low (Y11 Bits 7 ~ 0) ||

Full touch coordinate packet

DISPLAY DEVICE HAVING TOUCH SENSORS AND METHOD FOR TRANSMITTING TOUCH COORDINATE DATA THEREOF

This application claims the priority benefit of Korean Patent Application No. 10-2011-0140512 filed on Dec. 22, 2011, which is incorporated herein by reference for all purposes as if fully set forth herein.

BACKGROUND OF THE INVENTION

1. Field of the Invention

Embodiments of the invention relate to a display device having touch sensors and a method for transmitting touch coordinate data thereof.

2. Discussion of the Related Art

A touch screen has replaced button switches as a user input device due to the trend of light weight and thin profile of household appliances and electronic devices. A touch screen includes a plurality of touch sensors. A capacitive touch screen includes Tx electrode lines, Rx electrode lines crossing the Tx electrode lines, and sensor nodes formed at crossings of the Tx electrode lines and the Rx electrode lines. Each of the sensor nodes has a mutual capacitance.

A display device includes a touch screen driver which senses changes in voltage changed to the sensor nodes before and after a touch operation and decides a contact position of a conductive material. The touch screen driver includes a touch controller and a touch screen driving circuit.

The touch screen driving circuit applies a driving pulse to the Tx electrode line connected to a Tx channel and receives voltages of the of the sensor nodes through the Rx electrode lines. Each time the touch screen driving circuit senses the voltage of each sensor node, the touch screen driving circuit samples the sensor node voltage received through the Rx electrode line and then converts the sampled sensor node voltage into digital data, i.e., touch raw data. The touch screen driving circuit then transmits the touch raw data to the touch controller.

The touch controller applies a setup signal to the touch screen driving circuit and sets the Tx channel and an Rx channel, which will sense the sensor node voltage. The touch controller analyzes the touch raw data using a touch recognition algorithm program embedded therein and outputs touch coordinate data. The touch coordinate data output from the touch controller is transmitted to a host system. The host system runs an application which a touch coordinate value indicates.

The touch controller may transmit the touch coordinate data to the host system using HID human interface device) transmission manner in Windows 7 or I²C transmission manner. With the recent development of multi-touch technology, the touch recognition number (i.e., the touch group number) increases to be equal to or greater than 10, and thus the touch coordinate number greatly increases. Because the HID transmission manner uses USB communication having a fast data transmission speed, it takes a relatively short time to transmit the touch coordinate data even if an amount of touch coordinate data increases. On the other hand, because a maximum transmission frequency is limited to about 400 Khz in the I²C transmission manner, the I²C transmission manner may generate the problem if an amount of touch coordinate data to be transmitted increases.

As shown in FIG. 1, one touch frame includes a first period P1 in which touch sensing is performed, a second period P2 in which a touch recognition algorithm is performed, and a third period P3 in which the touch coordinate data is transmitted. Thus, in the I²C transmission manner having a slow data transmission speed, the third period P3 becomes an important factor for determining a touch report rate.

The related art I²C transmission manner is used to transmit a full touch coordinate packet including touch coordinate data of all of touch groups. The full touch coordinate packet includes not only touch coordinate data of an effective touch group, on which the touch operation is performed, but also touch coordinate data of an ineffective touch group, on which the touch operation is not performed. For example, as shown in FIG. 2, when 11 touch groups T1 to T11 are set and the effective touch group, on which the touch operation is performed, is set to two touch groups T4 and T8, the related art I²C transmission manner further includes the ineffective touch groups T1 to T3, T5 to T7, T9 to T11, on which the touch operation is not performed. Hence, the touch coordinate data of all of the touch groups T1 to T11 is configured as the full touch coordinate packet and transmitted.

FIG. 3 illustrates a transmission format of the touch coordinate data included in the full touch coordinate packet shown in FIG. 2. In FIGS. 2 and 3, Xn is horizontal touch coordinate data, and Yn is vertical touch coordinate data, where n is a natural number. When 12 bits are assigned to each of the horizontal touch coordinate data and the vertical touch coordinate data for the display of the horizontal and vertical touch coordinate data in consideration of a maximum resolution 4096 (horizontal resolution)*4096 (vertical resolution) of the touch screen, 3 bytes are required to represent touch coordinate data of one touch group. Thus, as shown in FIG. 3, an amount of data of the full touch coordinate packet is 33 bytes.

In the I²C transmission manner having the transmission frequency of about 400 Khz, a time required to transmit 1-byte data is about 25 μs to 30 μs including latency as shown in FIG. 4. Thus, a transmission time of the full touch coordinate packet consisting of 33-byte data is about 825 μs to 990 μs and considerably increases.

As described above, the related art I²C transmission manner is used to transmit the full touch coordinate packet including not only effective touch coordinate data (i.e., touch coordinate data of the effective touch groups) but also ineffective touch coordinate data (i.e., touch coordinate data of the ineffective touch groups). Hence, time required to transmit the touch coordinate data in one touch frame increases, and it is difficult to improve the touch report rate using the related art I²C transmission manner. Further, transmission efficiency of the related art I²C transmission manner is reduced because of an increase in an amount of transmitted data, and a transmission error thereof increases.

SUMMARY OF THE INVENTION

Embodiments of the invention provide a display device having touch sensors and a method for transmitting touch coordinate data thereof capable of reducing time required in the data transmission and a transmission error and improving a touch report rate.

In one aspect, there is a display device having touch sensors including a display panel including a touch screen having touch sensors, a Tx driving circuit configured to supply a touch driving pulse to Tx electrode lines of the touch screen, an Rx driving circuit configured to sample voltages of the touch sensors received through Rx electrode lines of the touch screen due to the supply of the touch driving pulse and output touch raw data from the voltages of the touch sensors, and a touch controller configured to obtain a plurality of touch groups based on the touch raw data, set a transmission format of an effective touch group, on which a touch operation is performed, among the plurality of touch groups to a variable touch coordinate packet, and transmit the variable touch coordinate packet to an external host system.

The variable touch coordinate packet includes touch coordinate data of the effective touch group and a touch ID indicating information representing the effective touch group among the plurality of touch groups.

An amount of data of the variable touch coordinate packet depends on the number of effective touch groups.

The touch controller transmits the variable touch coordinate packet to the host system through an I²C transmission manner.

In another aspect, there is a method for transmitting touch coordinate data of a display device having touch sensors, which includes a display panel having a touch screen, the method comprising supplying a touch driving pulse to Tx electrode lines of the touch screen, sampling voltages of the touch sensors received through Rx electrode lines of the touch screen due to the supply of the touch driving pulse and outputting touch raw data from the voltages of the touch sensors, and obtaining a plurality of touch groups based on the touch raw data, setting a transmission format of an effective touch group, on which a touch operation is performed, among the plurality of touch groups to a variable touch coordinate packet, and transmitting the variable touch coordinate packet to an external host system.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Example embodiments of the invention will be described with reference to FIGS. 5 to 13.

Figure 1:
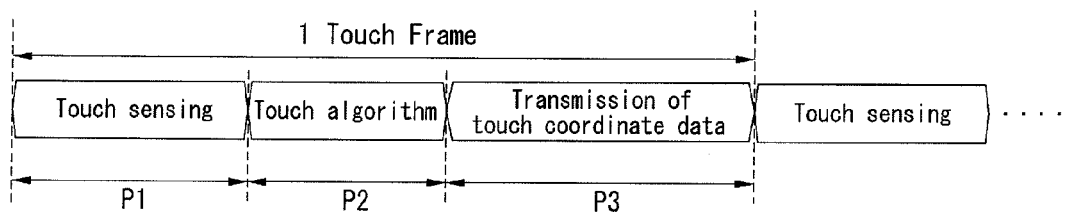
FIG. 1 illustrates configuration of one touch frame.
Figure 2:
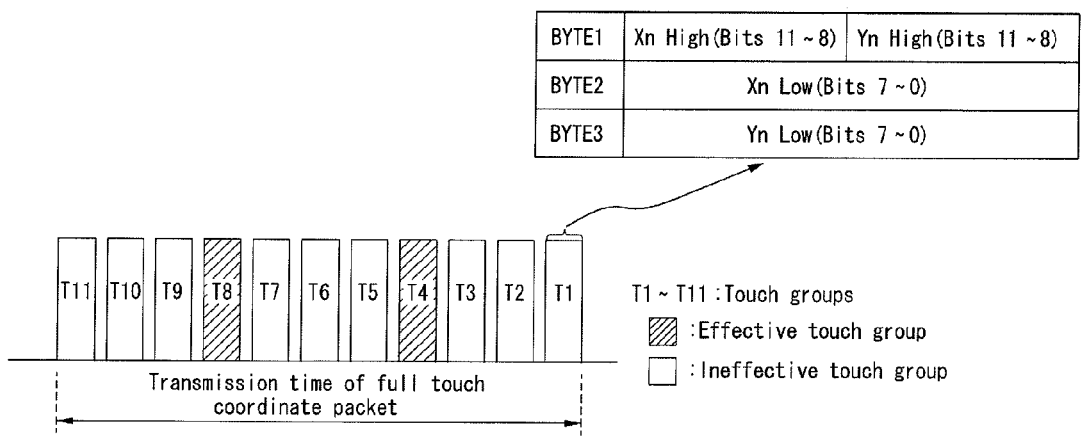
FIG. 2 illustrates an example of configuration of a full touch coordinate packet.
Figure 3:
FIG. 3 illustrates a transmission format of touch coordinate data included in a full touch coordinate packet shown in FIG. 2.
Figure 4:
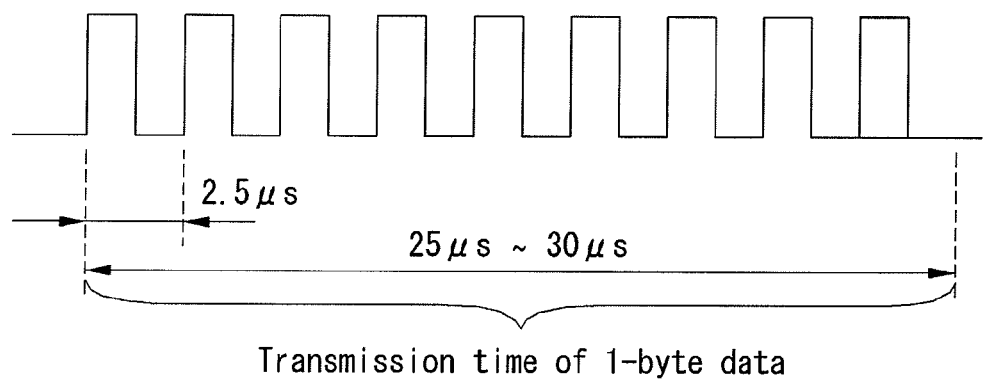
FIG. 4 illustrates time required to transmit 1-byte data in an I²C transmission manner having a transmission frequency of about 400 Khz.
Figure 5:
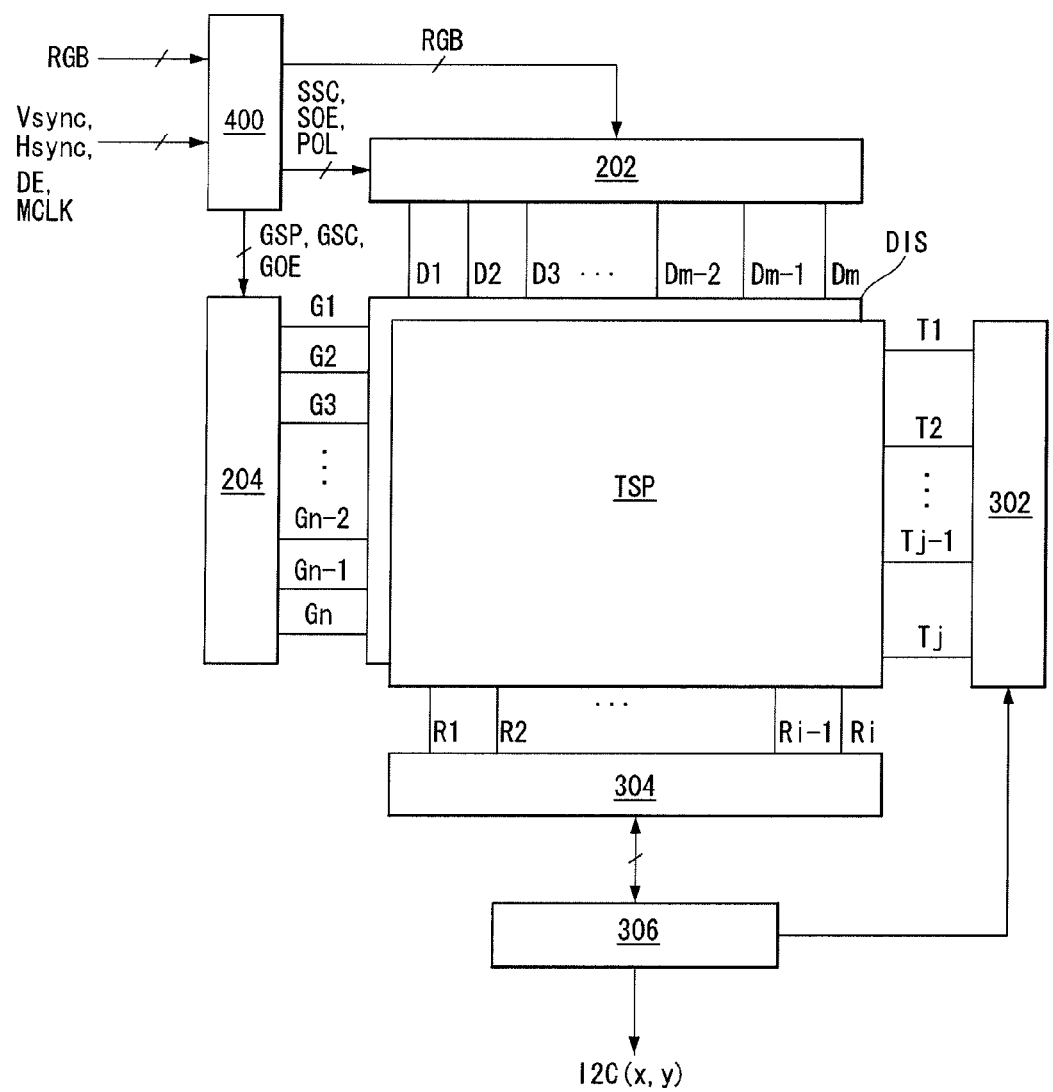
FIG. 5 is a block diagram of a display device having touch sensors according to an example embodiment of the invention.
Figure 6:
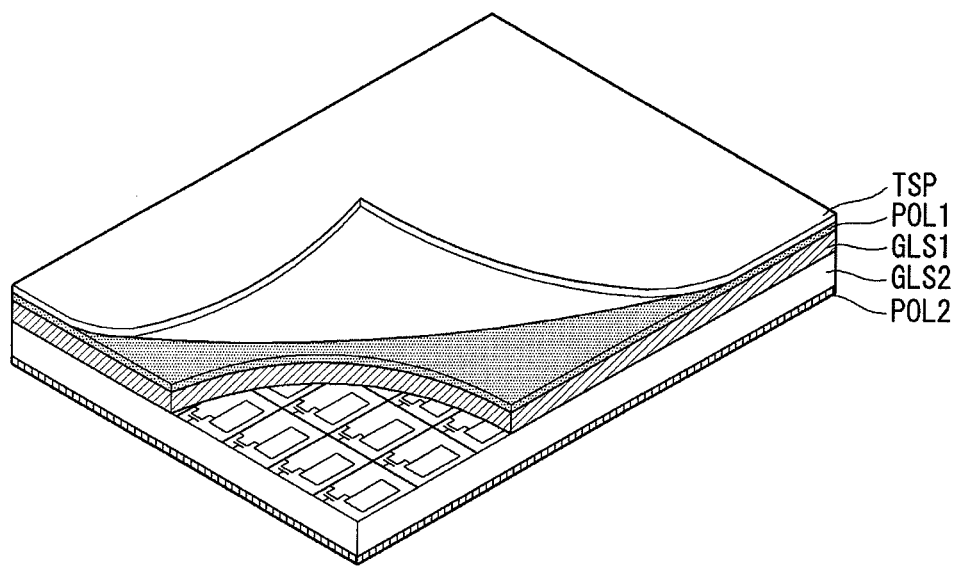
FIGS. 6 to 8 illustrate various combinations of a touch screen and a display panel according to an example embodiment of the invention.
Figure 7:
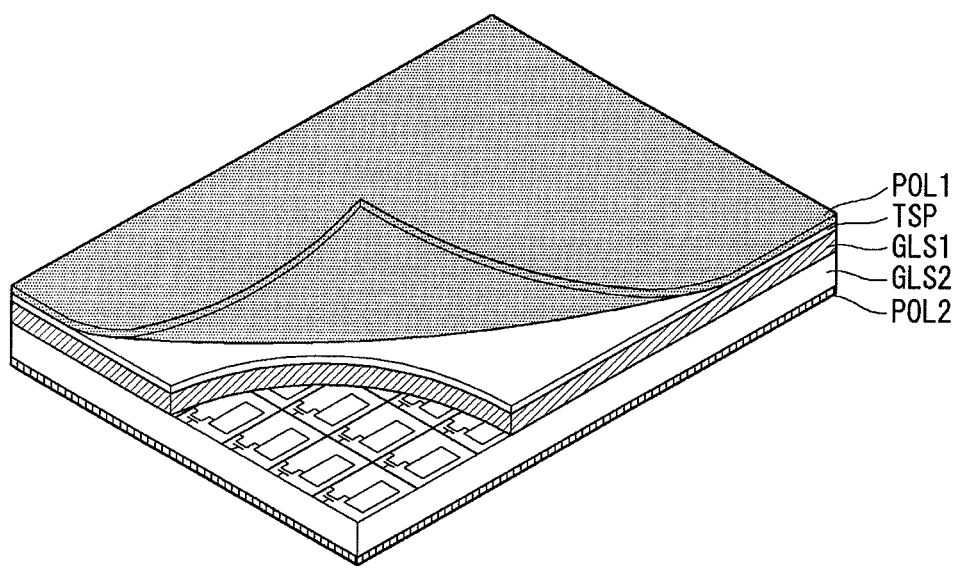
Figure 8:
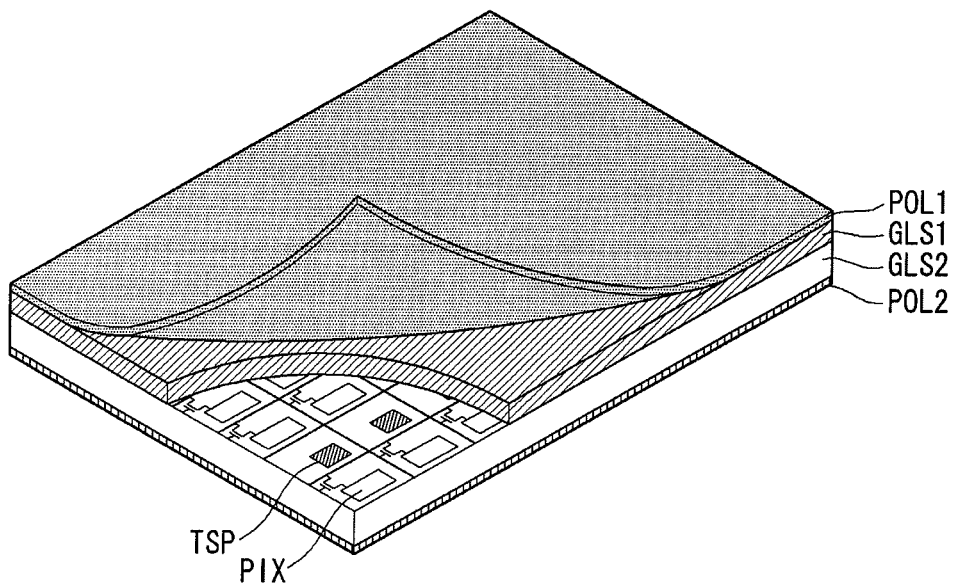

FIG. 5 is a block diagram of a display device having touch sensors according to an example embodiment of the invention. FIGS. 6 to 8 illustrate various combinations of a touch screen and a display panel according to an example embodiment of the invention.

As shown in FIG. 5, a display device according to an example embodiment of the invention includes a display panel DIS, a display driving circuit, a timing controller 400, a touch screen TSP, a touch screen driving circuit, a touch controller 306, etc. All components of the display device are operatively coupled and configured.

The display device according to the embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

The display panel DIS includes a lower glass substrate GLS2, an upper glass substrate GLS1, and a liquid crystal layer formed between the lower glass substrate GLS2 and the upper glass substrate GLS1. The lower glass substrate GLS2 of the display panel DIS includes a plurality of data lines D1 to Dm, where m is a natural number, a plurality of gate lines or scan lines G1 to Gn crossing the data lines D1 to Dm, where n is a natural number, a plurality of thin film transistors (TFTs) formed at crossings of the data lines D1 to Dm and the gate lines G1 to Gn, a plurality of pixel electrodes for charging liquid crystal cells to a data voltage, a plurality of storage capacitors, each of which is connected to the pixel electrode and holds a voltage of the liquid crystal cell, etc.

Pixels of the display panel DIS are respectively formed in pixel areas defined by the data lines D1 to Dm and the gate lines G1 to Gn to form a matrix structure. The liquid crystal cell of each pixel is driven by an electric field generated depending on a voltage difference between the data voltage supplied to the pixel electrode and a common voltage supplied to a common electrode, thereby adjusting an amount of incident light transmitted by the liquid crystal cell. The TFTs are turned on in response to a gate pulse (or a scan pulse) from the gate lines G1 to Gn, thereby supplying the voltage from the data lines D1 to Dm to the pixel electrodes of the liquid crystal cells.

The upper glass substrate GLS1 of the display panel DIS may include black matrixes, color filters, etc. The lower glass substrate GLS2 of the display panel DIS may be configured in a COT (color filter on TFT) structure. In this instance, the black matrixes and the color filters may be formed on the lower glass substrate GLS2 of the display panel DIS.

Polarizing plates POL1 and POL2 are respectively attached to the upper and lower glass substrates GLS1 and GLS2 of the display panel DIS. Alignment layers for setting a pre-tilt angle of liquid crystals are respectively formed on the inner surfaces contacting the liquid crystals in the upper and lower glass substrates GLS1 and GLS2 of the display panel DIS. A column spacer may be formed between the upper and lower glass substrates GLS1 and GLS2 of the display panel DIS to keep cell gaps of the liquid crystal cells constant.

A backlight unit may be disposed on a back surface of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 202 and a scan driving circuit 204. The display driving circuit applies a video data voltage of an input image to the pixels of the display panel DIS. The data driving circuit 202 converts video data RGB received from the timing controller 400 into positive and negative analog gamma compensation voltages based on a polarity control signal POL and generates the data voltage. The data driving circuit 202 then supplies the data voltage to the data lines D1 to Dm. The scan driving circuit 204 sequentially supplies the gate pulse synchronized with the data voltage to the gate lines G1 to Gn and selects pixel lines of the display panel DIS to which the data voltage will be applied.

The timing controller 400 receives timing signals, such as a vertical sync signal Vsync, a horizontal sync signal Hsync, a data enable DE, and a main clock MCLK, from an external host system. The timing controller 400 generates a data timing control signal and a scan timing control signal for respectively controlling operation timings of the data driving circuit 202 and the scan driving circuit 204 using the timing signals.

The scan timing control signal includes a gate start pulse GSP, a gate shift clock GSC, a gate output enable GOE, and the like. The gate start pulse GSP indicates a start horizontal line of a scan operation in one vertical period in which one screen is displayed. The gate shift clock GSC is a clock that is input to a shift resistor inside the scan driving circuit 204 to sequentially shift the gate start pulse GSP. The gate output enable GOE controls an output of the scan driving circuit 204.

The data timing control signal includes a source start pulse SSP, a source sampling clock SSC, a source output enable SOE, the polarity control signal POL, and the like. The source start pulse SSP indicates a start point of data in one horizontal period, in which data corresponding to one horizontal line is displayed. The source sampling clock SSC controls a latch operation of data based on a rising or falling edge thereof. The source output enable SOE controls an output of the data driving circuit 202. The polarity control signal POL controls a polarity of the data voltage to be supplied to the liquid crystal cells of the display panel DIS.

The timing controller 400 arranges the video data RGB received from the host system to be suitable for the display panel DIS and supplies the arranged video data RGB to the data driving circuit 202.

As shown in FIG. 6, the touch screen TSP may be attached on the upper polarizing plate POL1 of the display panel DIS. Alternatively, as shown in FIG. 7, the touch screen TSP may be formed between the upper polarizing plate POL1 and the upper glass substrate GLS1. Alternatively, as shown in FIG. 8, the touch screen TSP may be formed on the lower glass substrate GLS2 along with a pixel array of the display panel DIS in an in-cell manner. In FIGS. 6 to 8, 'PIX' denotes the pixel electrode of the liquid crystal cell.

The touch screen TSP includes Tx electrode lines T1 to Tj, where j is a positive integer less than n, Rx electrode lines R1 to Ri crossing the Tx electrode lines T1 to Tj, where i is a positive integer less than m, and a plurality of touch sensors formed at crossings of the Tx electrode lines T1 to Tj and the Rx electrode lines R1 to Ri. Each of the plurality of touch sensors is implemented as a mutual capacitor formed at each of the crossings of the Tx electrode lines T1 to Tj and the Rx electrode lines R1 to Ri.

The touch screen driving circuit includes a Tx driving circuit 302 and an Rx driving circuit 304. The touch screen driving circuit supplies a touch driving pulse to the Tx electrode lines T1 to Tj and samples voltages (or touch sensor voltages) of the touch sensors through the Rx electrode lines R1 to Ri to convert the sampled touch sensor voltages into digital data. The Tx driving circuit 302 and the Rx driving circuit 304 may be integrated in one readout integrated circuit (ROTC).

The Tx driving circuit 302 sets a Tx channel, which will output the touch driving pulse, under the control of the touch controller 306. The Tx driving circuit 302 generates the touch driving pulse under the control of the touch controller 306 and supplies the touch driving pulse to the Tx electrode lines T1 to Tj connected to the Tx channel. The Tx driving circuit 302 may repeatedly supply the touch driving pulse to each of the Tx electrode lines T1 to Tj several times, so as to secure a sufficient sensing time.

The Rx driving circuit 304 receives the voltages of the touch sensors through Rx channels connected to the Rx electrode lines R1 to Ri and samples the touch sensor voltages in response to a sensing enable signal received from the touch controller 306. The Rx driving circuit 304 may repeatedly sample an output of each of the touch sensors several times in response to the touch driving pulse, which is repeatedly supplied several times, in one touch frame. The Rx driving circuit 304 converts the sampled touch sensor voltages into digital data, i.e., touch raw data and transmits the touch raw data to the touch controller 306.

The touch controller 306 is connected to the Tx driving circuit 302 and the Rx driving circuit 304 through an interface such as I²C bus, a serial peripheral interface (SPI), and a system bus. The touch controller 306 supplies a setup signal to the Tx driving circuit 302 and sets the Tx channel, to which the touch driving pulse will be output. The touch controller 306 generates the sensing enable signal based on display timing of the video data RGB and supplies the sensing enable signal to the Rx driving circuit 304, thereby controlling sampling timing of the voltages of the touch sensors.

The touch controller 306 analyzes the touch raw data received from the Rx driving circuit 304 using a previously determined touch recognition algorithm and outputs touch coordinate data. The touch controller 306 may divide the touch coordinate data into a plurality of touch groups. The touch coordinate data from the touch controller 306 is transmitted to the host system through an I²C transmission manner. The host system runs an application which the touch coordinate data indicates.

The touch controller 306 sets a transmission format of touch coordinate data to a variable touch coordinate packet including effective touch coordinate data (i.e., touch coordinate data of effective touch groups, on which a touch operation is performed) and transmits the variable touch coordinate packet to the host system through the I²C transmission manner, so as to reduce time required in the data transmission and a transmission error and to improve a touch report rate. The variable touch coordinate packet further includes touch ID indicating information which represents an effective touch group, on which the touch operation is really performed, among all of the touch groups. Namely, the touch ID indicating information represents the effective touch group including effective touch coordinate data. The variable touch coordinate packet does not include ineffective touch coordinate data (i.e., touch coordinate data of an ineffective touch group, on which the touch operation is not performed). An amount of data of the variable touch coordinate packet depends on the number of effective touch groups. As an occupancy rate of the effective touch coordinate data based on the entire touch coordinate data decreases, a transmission time of data decreases.

Figure 9:
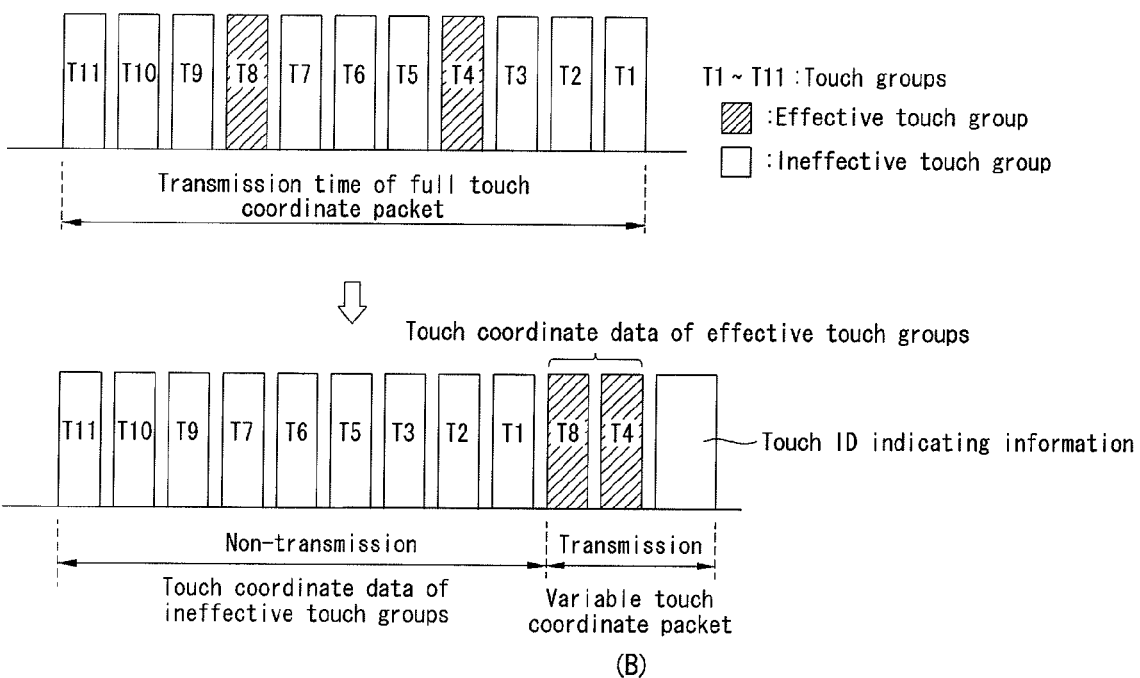
FIG. 9 illustrates an example of configuration of a variable touch coordinate packet.
Figures 10, 11:
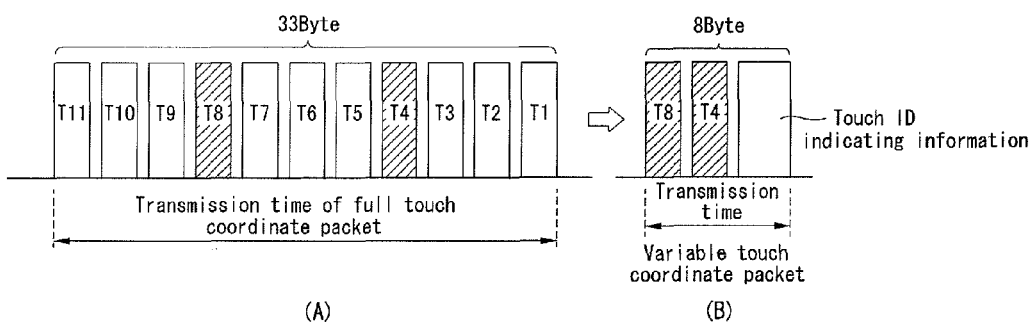
FIG. 10 illustrates a transmission format of touch coordinate data included in a variable touch coordinate packet shown in FIG. 9.
FIG. 11 illustrates a comparison between a related art and an example embodiment of the invention in a transmission amount of data and a transmission time.

FIG. 9 illustrates an example of configuration of the variable touch coordinate packet. FIG. 10 illustrates a transmission format of touch coordinate data included in the variable touch coordinate packet shown in FIG. 9.

More specifically, FIG. 9 illustrates a plurality of touch groups T1 to T11. The touch controller 306 gives an ID to each of the touch groups T1 to T11, so as to distinguish the touch groups T1 to T11. In FIG. 10, FID1 to FID11 denote the IDs of the touch groups T1 to T11, respectively.

As shown in FIG. 9, when the touch operation is performed only on the fourth and eighth touch groups T4 and T8 of the touch groups T1 to T11, the touch controller 306 sets the transmission format of touch coordinate data to the variable touch coordinate packet including the touch coordinate data of the effective touch groups T4 and T8 and the touch ID indicating information representing the effective touch groups. The variable touch coordinate packet does not include touch coordinate data of the ineffective touch groups T1 to T3, T5 to T7, and T9 to T11, on which the touch operation is not performed.

As shown in FIG. 10, because the number of touch groups is 11, the touch controller 306 stores the touch ID indicating information using 2 bytes inside the variable touch coordinate packet. Touch ID indicating informations about the first to eighth touch IDs FID1 to FID8 are respectively stored in 0 to 7 bits of 1 byte BYTE1 of assigned 2 bytes, and touch ID indicating informations about the ninth to eleventh touch IDs FID9 to FID11 are respectively stored in 0 to 2 bits of other 1 byte BYTE2 of the assigned 2 bytes. The touch controller 306 may store touch ID indicating informations about the touch IDs FID4 and FID8 of the effective touch groups T4 and T8 as '1 (on)' and store touch ID indicating informations about the touch IDs FID1 to FID3, FID5 to FID7, and FID9 to FID11 of the ineffective touch groups T1 to T3, T5 to T7, and T9 to T11 as '0 (off)'.

When 12 bits are assigned to each of horizontal touch coordinate data and vertical touch coordinate data for the display of the horizontal and vertical touch coordinate data in consideration of a maximum resolution 4096 (horizontal resolution)*4096 (vertical resolution) of the touch screen TSP, 3 bytes are required to represent touch coordinate data of one touch group. The touch controller 306 stores touch coordinate data of the effective touch groups each having the touch ID indicating information of '1 (on)' using k-byte inside the variable touch coordinate packet. As shown in FIG. 10, when the number of effective touch groups is two, the touch controller 306 assigns 6 bytes to the variable touch coordinate packet so as to store touch coordinate data. Touch coordinate data (X4, Y4) of the fourth touch group T4 is stored in 3 bytes BYTE3 to BYTE5 of assigned 6 bytes, and touch coordinate data (X8, Y8) of the eighth touch group T8 is stored in the other 3 bytes BYTE6 to BYTE8 of the assigned 6 bytes. In FIG. 10, 'X4' is horizontal touch coordinate data of the fourth touch group T4, 'Y4' is vertical touch coordinate data of the fourth touch group T4, 'X8' is horizontal touch coordinate data of the eighth touch group T8, and 'Y8' is vertical touch coordinate data of the eighth touch group T8.

Figure 12:
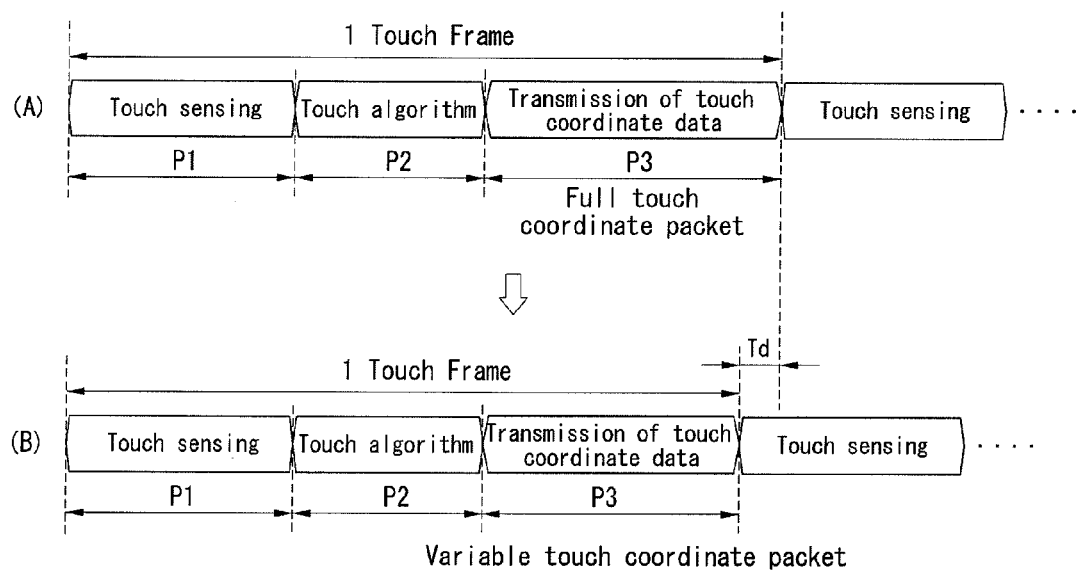
FIG. 12 illustrates a comparison between a related art and an example embodiment of the invention in configuration of one touch frame.

FIG. 11 illustrates a comparison between a related art and the embodiment of the invention in a transmission amount of data and a transmission time. FIG. 12 illustrates a comparison between a related art and the embodiment of the invention in configuration of one touch frame.

In the related art, as shown in (A) of FIG. 11, even if the number of effective touch groups T4 and T8, on which the touch operation is really performed, is two, a full touch coordinate packet including touch coordinate data of all of the touch groups T1 to T11 was set to a transmission format. In the related art, a transmission time increased because of a transmission amount of 33-byte data. As shown in FIG. 12, one touch frame includes a first period P1 in which touch sensing is performed, a second period P2 in which a touch recognition algorithm is performed, and a third period P3 in which the touch coordinate data is transmitted. In the related art, as shown in (A) of FIG. 12, a length of the third period P3 assigned to the transmission of the touch coordinate data increased, and thus it was difficult to improve the touch report rate.

On the other hand, in the embodiment of the invention, as shown in (B) of FIG. 11, when the number of effective touch groups T4 and T8, on which the touch operation is really performed, is two, the variable touch coordinate packet including touch coordinate data of the effective touch groups T4 and T8 and touch ID indicating information is set to a transmission format. In the embodiment of the invention, a transmission time is greatly reduced because of a transmission amount of 8-byte data. In the embodiment of the invention, as shown in (B) of FIG. 12, a length of the third period P3 assigned to the transmission of the touch coordinate data may be freely adjusted depending on the number of effective touch groups, and thus it is easy to improve the touch report rate.

The transmission amount of data configuring the variable touch coordinate packet and the length of the third period P3 assigned to the transmission of the touch coordinate data decrease as an occupancy rate of the effective touch groups based on all of the touch groups decreases. If the touch operation is not performed on all of the touch groups, the number of effective touch groups is less than the total number of the touch groups. In this instance, if the variable touch coordinate packet is used as in the embodiment of the invention, a length of one touch frame is reduced by a predetermined time Td compared with the related art, and also the touch report rate is improved due to a reduction in the length of the one touch frame.

Figure 13:
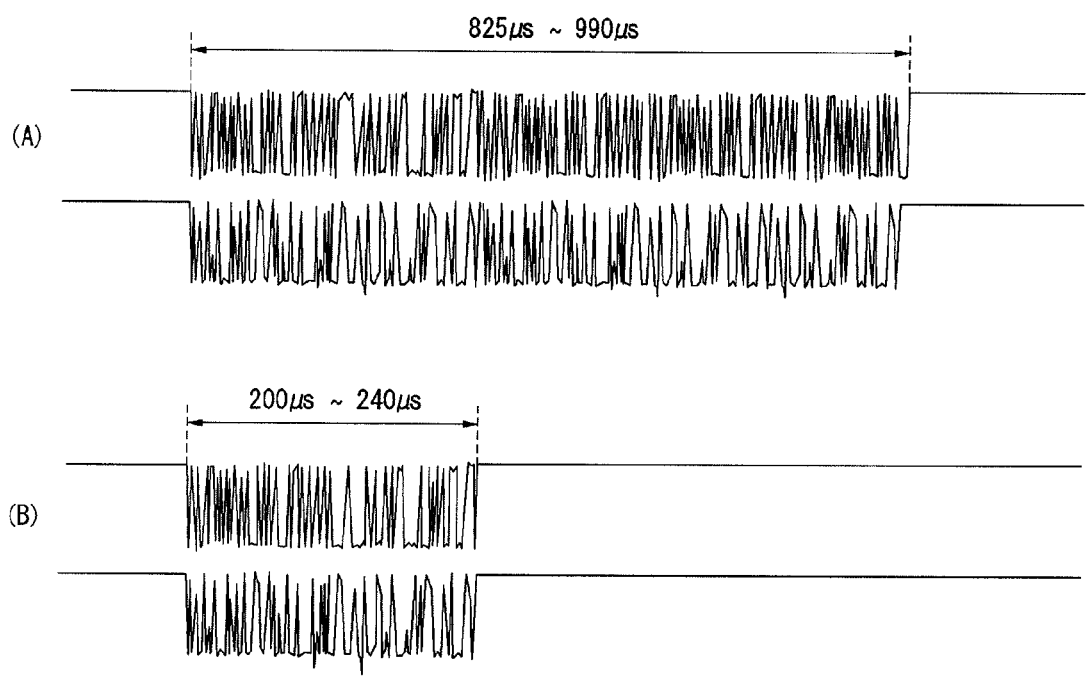
FIG. 13 illustrates a comparison of simulation results of a transmission time of a related art and a transmission time of an example embodiment of the invention in an I²C transmission manner having a transmission frequency of about 400 Khz.

FIG. 13 illustrates a comparison of simulation results of a transmission time of the related art and a transmission time of the embodiment of the invention in an $I^2C$ transmission manner having a transmission frequency of about 400 Khz. In an experiment shown in FIG. 13, it was assumed that 11 touch groups were set and a touch operation was performed on two of the 11 touch groups.

In the $I^2C$ transmission manner having the transmission frequency of about 400 Khz, a time required to transmit 1-byte data is about 25 μs to 30 μs including latency.

When the transmission format was set to the full touch coordinate packet consisting of 33 bytes as in the related art, a transmission time of data was about 825 μs to 990 μs and was very long as shown in (A) of FIG. 13.

On the other hand, when the transmission format was set to the variable touch coordinate packet consisting of 8 bytes as in the embodiment of the invention, a transmission time of data was greatly reduced to about 200 μs to 240 μs compared to the related art, as shown in (B) of FIG. 13.

As described above, the embodiment of the invention configures the variable touch coordinate packet using the touch coordinate data of the effective touch group, on which the touch operation is really performed, among the plurality of touch groups and transmits the variable touch coordinate packet. Hence, the embodiment of the invention reduces the transmission amount of data, and thus time required in the data transmission and the transmission error are reduced in the I²C transmission manner having the slow transmission speed. As a result, the touch report rate may be improved.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device having touch sensors, the display device comprising:
   a display panel including a touch screen having touch sensors;
   a Tx driving circuit configured to supply a touch driving pulse to Tx electrode lines of the touch screen;
   an Rx driving circuit configured to sample voltages of the touch sensors received through Rx electrode lines of the touch screen due to the supply of the touch driving pulse and output touch raw data from the voltages of the touch sensors; and
   a touch controller configured to obtain a plurality of touch groups based on the touch raw data, set a transmission format of an effective touch group, on which a touch operation is performed, among the plurality of touch groups to a variable touch coordinate packet, and transmit the variable touch coordinate packet to an external host system,
   wherein the effective touch group represents a touch sensor that received a touch input, and an ineffective touch group represents a touch sensor that did not receive a touch input,
   wherein the touch controller is further configured to change a size of the variable touch coordinate packet according to a number of effective touch groups among the plurality of touch groups, and ineffective touch groups are excluded from the variable touch coordinate packet,
   wherein the variable touch coordinate packet includes a touch ID indicating information representing the effective touch group among the plurality of touch groups, and a plurality of touch coordinate data of effective touch groups subsequent to the touch ID indicating information, and
   wherein the touch ID indicating information is stored in upper bytes of the variable touch coordinate packet, and the touch coordinate data of effective touch groups are sequentially stored in remaining bytes other than the upper bytes of the variable touch coordinate packet.

2. The display device having touch sensors of claim 1, wherein the touch controller transmits the variable touch coordinate packet to the host system through an I²C transmission manner.

3. A method for transmitting touch coordinate data of a display device having touch sensors, which includes a display panel having a touch screen, the method comprising:
   supplying a touch driving pulse to Tx electrode lines of the touch screen;
   sampling voltages of the touch sensors received through Rx electrode lines of the touch screen due to the supply of the touch driving pulse and outputting touch raw data from the voltages of the touch sensors; and
   obtaining a plurality of touch groups based on the touch raw data, setting a transmission format of an effective touch group, on which a touch operation is performed, among the plurality of touch groups to a variable touch coordinate packet, and transmitting the variable touch coordinate packet to an external host system,
   wherein the effective touch group represents a touch sensor that received a touch input, and an ineffective touch group represents a touch sensor that did not receive a touch input,
   wherein the touch controller is further configured to change a size of the variable touch coordinate packet according to a number of effective touch groups among the plurality of touch groups, and ineffective touch groups are excluded from the variable touch coordinate packet,
   wherein the variable touch coordinate packet includes a touch ID indicating information representing the effective touch group among the plurality of touch groups, and a plurality of touch coordinate data of effective touch groups subsequent to the touch ID indicating information, and
   wherein the touch ID indicating information is stored in upper bytes of the variable touch coordinate packet, and the touch coordinate data of effective touch groups are sequentially stored in remaining bytes other than the upper bytes of the variable touch coordinate packet.

4. The method of claim 3, wherein the variable touch coordinate packet is transmitted to the host system through an I²C transmission manner.

* * * * *